US011942247B2

United States Patent

(12) United States Patent
Schoen et al.
(10) Patent No.: US 11,942,247 B2
(45) Date of Patent: Mar. 26, 2024

(54) GRAIN ORIENTED ELECTRICAL STEEL WITH IMPROVED FORSTERITE COATING CHARACTERISTICS

(71) Applicant: AK Steel Properties, Inc., West Chester, OH (US)

(72) Inventors: Jerry William Schoen, Cincinnati, OH (US); Kimani Tirawa Partin, Franklin, OH (US); Christopher Mark Wilkins, Centennial, CO (US)

(73) Assignee: Cleveland-Cliffs Steel Properties Inc., Cleveland, OH (US)

(*) Notice: Subject to any disclaimer, the term of this patent is extended or adjusted under 35 U.S.C. 154(b) by 632 days.

(21) Appl. No.: 15/850,033

(22) Filed: Dec. 21, 2017

(65) Prior Publication Data

US 2018/0137958 A1 May 17, 2018

Related U.S. Application Data

(62) Division of application No. 14/468,963, filed on Aug. 26, 2014, now Pat. No. 9,881,720.

(Continued)

(51) Int. Cl.

| | |
|---|---|
| ***H01F 1/147*** | (2006.01) |
| ***C21D 8/12*** | (2006.01) |
| ***C22C 38/00*** | (2006.01) |
| ***C22C 38/04*** | (2006.01) |
| ***C22C 38/06*** | (2006.01) |

(Continued)

(52) U.S. Cl.

CPC ....... *H01F 1/14783* (2013.01); *C21D 8/1255* (2013.01); *C21D 8/1283* (2013.01); *C21D 8/1288* (2013.01); *C22C 38/001* (2013.01); *C22C 38/002* (2013.01); *C22C 38/004* (2013.01); *C22C 38/008* (2013.01); *C22C 38/04* (2013.01); *C22C 38/06* (2013.01);

(Continued)

(58) Field of Classification Search

None

See application file for complete search history.

(56) References Cited

U.S. PATENT DOCUMENTS

| | | | |
|---|---|---|---|
| 4,456,812 | A | 6/1984 | Neiheisel et al. |
| 4,545,828 | A | 10/1985 | Schoen et al. |

(Continued)

FOREIGN PATENT DOCUMENTS

| | | | |
|---|---|---|---|
| CN | 1254021 | A | 5/2000 |
| CN | 1104507 | C | 4/2003 |

(Continued)

OTHER PUBLICATIONS

Bib Data and Translation ; JP-2000355717-A; Toda, Hiroaki; Toda, Hiroaki (Year: 2000).*

(Continued)

*Primary Examiner* — Humera N. Sheikh
*Assistant Examiner* — Elizabeth D Ivey
(74) *Attorney, Agent, or Firm* — Frost Brown Todd LLP

(57) ABSTRACT

Increasing the chromium content of an electrical steel substrate to a level greater than or equal to about 0.45 weight percent (wt %) produced a much improved forsterite coating having superior and more uniform coloration, thickness and adhesion. Moreover, the so-formed forsterite coating provides greater tension potentially reducing the relative importance of any secondary coating.

2 Claims, 18 Drawing Sheets

Related U.S. Application Data

(60) Provisional application No. 61/870,332, filed on Aug. 27, 2013.

(51) Int. Cl.
*C22C 38/34* (2006.01)
*C21D 1/76* (2006.01)

(52) U.S. Cl.
CPC ......... *C22C 38/34* (2013.01); *H01F 1/14791* (2013.01); *C21D 1/76* (2013.01); *C21D 8/1222* (2013.01)

(56) References Cited

U.S. PATENT DOCUMENTS

| | | | | |
|---|---|---|---|---|
| 4,554,029 A | | 11/1985 | Schoen et al. | |
| 4,718,951 A | | 1/1988 | Schoen | |
| 4,882,831 A | | 11/1989 | Schoen | |
| 4,898,626 A | | 2/1990 | Shoen et al. | |
| 4,898,627 A | * | 2/1990 | Schoen ................ | C21D 8/1244 148/112 |
| 4,948,656 A | | 8/1990 | Schoen | |
| 5,018,267 A | | 5/1991 | Schoen | |
| 5,061,326 A | | 10/1991 | Shoen | |
| 5,078,080 A | | 1/1992 | Schoen | |
| 5,096,510 A | | 3/1992 | Schoen et al. | |
| 5,116,686 A | | 5/1992 | Schoen | |
| 5,288,736 A | | 2/1994 | Schoen et al. | |
| 5,421,911 A | | 6/1995 | Schoen | |
| 5,702,539 A | | 12/1997 | Schoen et al. | |
| 6,475,304 B2 | | 11/2002 | Toda et al. | |
| 6,739,384 B2 | | 5/2004 | Schoen et al. | |
| 6,749,693 B2 | | 6/2004 | Schoen et al. | |
| 7,011,139 B2 | | 3/2006 | Schoen et al. | |
| 7,140,417 B2 | | 11/2006 | Schoen et al. | |
| 7,377,986 B2 | | 5/2008 | Schoen et al. | |
| 7,887,645 B1 | * | 2/2011 | Schoen ................. | C22C 38/008 148/111 |
| 9,396,850 B2 | * | 7/2016 | Yamaguchi .......... | C21D 8/1233 |
| 2002/0000265 A1 | | 1/2002 | Toda et al. | |
| 2013/0098508 A1 | | 4/2013 | Yamaguchi et al. | |

FOREIGN PATENT DOCUMENTS

| | | | | | |
|---|---|---|---|---|---|
| CN | 1461357 | A | | 12/2003 | |
| CN | 101748259 | A | | 6/2010 | |
| EP | 0743370 | | | 11/1996 | |
| EP | 0987343 | | | 3/2000 | |
| EP | 1227163 | | | 7/2002 | |
| JP | 06336617 | A | * | 12/1994 | |
| JP | H0762438 | A | * | 3/1995 | |
| JP | H09-118964 | | | 5/1997 | |
| JP | H09118921 | | * | 5/1997 | |
| JP | 2000-096149 | | | 4/2000 | |
| JP | 2000/355717 | | | 12/2000 | |
| JP | 2000355717 | A | * | 12/2000 | |
| JP | 2001-123229 | | | 5/2001 | |
| JP | 2002-194434 | | | 7/2002 | |
| JP | 2002-220642 | | | 8/2002 | |
| JP | 2005-504881 | | | 2/2005 | |
| JP | 2006-144042 | | | 6/2006 | |
| KR | 10-0441234 | | | 9/2004 | |
| RU | 2285058 | C2 | | 10/2006 | |
| RU | 2378394 | C1 | | 1/2010 | |
| WO | WO 02/090603 | | | 11/2002 | |
| WO | WO-2012001953 | A1 | * | 1/2012 | ............ C22C 38/20 |
| WO | WO 2014/049770 | | | 4/2014 | |

OTHER PUBLICATIONS

Bib Data and Translation JPH09118921; Tachibana et al; May 1997 (Year: 1997).*

Bib Data and translation ; JP-06336617-A; Ishitobi H; Dec. 1994 (Year: 1994).*

Bib Data and translation ; JPH0762438-A; Fukazawa et al; Mar. 1995 (Year: 1995).*

Chinese Office Action for Application No. 2014800471900 dated Dec. 18, 2017, 10 pgs.

Japanese Office Action for Application No. 2016-537773 dated May 9, 2017, 3 pgs.

Russian Office Action for Application No. 2016111134 dated Jun. 1, 2017.

Canadian Office Action dated Oct. 11, 2017 for U.S. Pat. No. 2,920,750, 3 pages.

Chinese Office Action dated Jun. 1, 2017 for Application No. 201480047190.0, 7 pgs.

Chinese Office Action dated Apr. 3, 2018 for Application No. 201480047190.0, 13 pgs.

European Communication dated Nov. 14, 2017 for Application No. 14766046.8, 4 pgs.

Japanese Office Action dated Jan. 9, 2018 for Application No. 2016-537773, 4 pgs.

Japanese Pre-Trial Patentability Report dated Jul. 3, 2018 for Application No. 2016-537773, 4 pgs.

Korean Office Action dated Nov. 14, 2017 for Application No. 10-2016-7007934, 8 pgs.

Korean Office Action dated Jun. 4, 2018 for Application No. 10-2016-7007934, 6 pgs.

Canadian Office Action dated Jan. 30, 2017 for U.S. Pat. No. 2,920,750, 4 pages.

Certified English Translation of Japanese Patent Application Publication No. P2000-355717A, filed by Applicant, Kawasaki Steel Corp., published Dec. 26, 2000. Translation prepared by Park IP Translations. Japanese language publication and machine translation filed in current application Dec. 16, 2014, 28 pgs.

Chinese Search Report for Application No. 2014800471900 dated Sep. 20, 2016, 2 pgs.

Chinese Office Action for Application No. 2014800471900 dated Oct. 9, 2016, 2 pgs.

International Search Report and Written Opinion dated Nov. 26, 2014 for Application No. PCT/US2014/052731.

Korean Office Action, Notice of Preliminary Rejection, dated Feb. 13, 2017 for Application No. 10-2016-7007934, 13 pages.

Taiwanese Office Action dated Aug. 27, 2014 for Application No. TW 103129599, 11 pgs.

Taiwanese Office Action dated Jul. 13, 2016 for Application No. TW 103129599, 7 pgs.

Japanese Office Action dated Feb. 19, 2019 for Application No. 2016-537773, 17 pgs.

Japanese Office Action dated Jun. 4, 2019 for Application No. 2018-089858, 7 pgs.

* cited by examiner

Figure 1: Micrographs of Surface Oxide and Oxygen Content After Decarburization Annealing
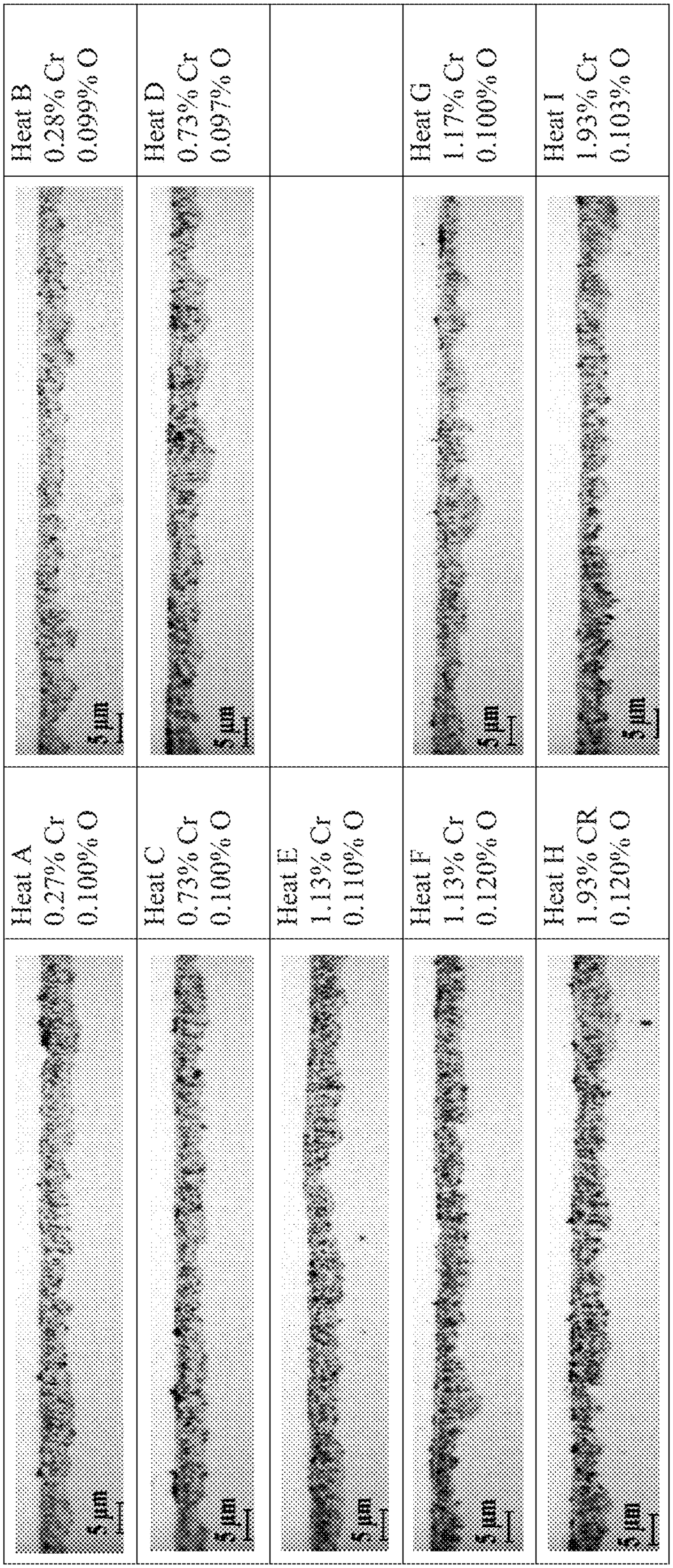

Figure 2: GDS Analysis of Oxygen Profile Of Annealed Surface
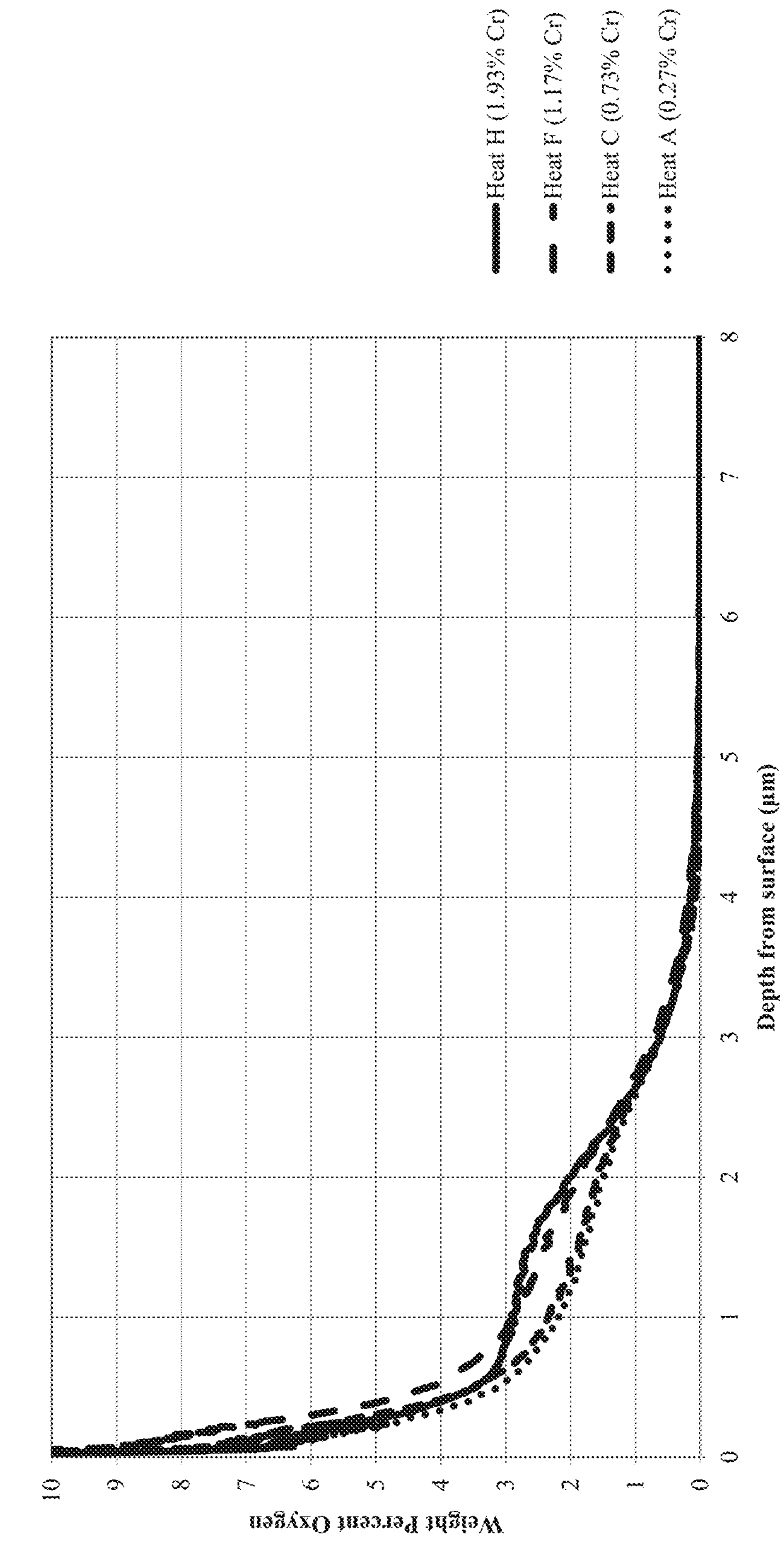

Figure 3: GDS Analysis of Chromium Profile of Annealed Surface
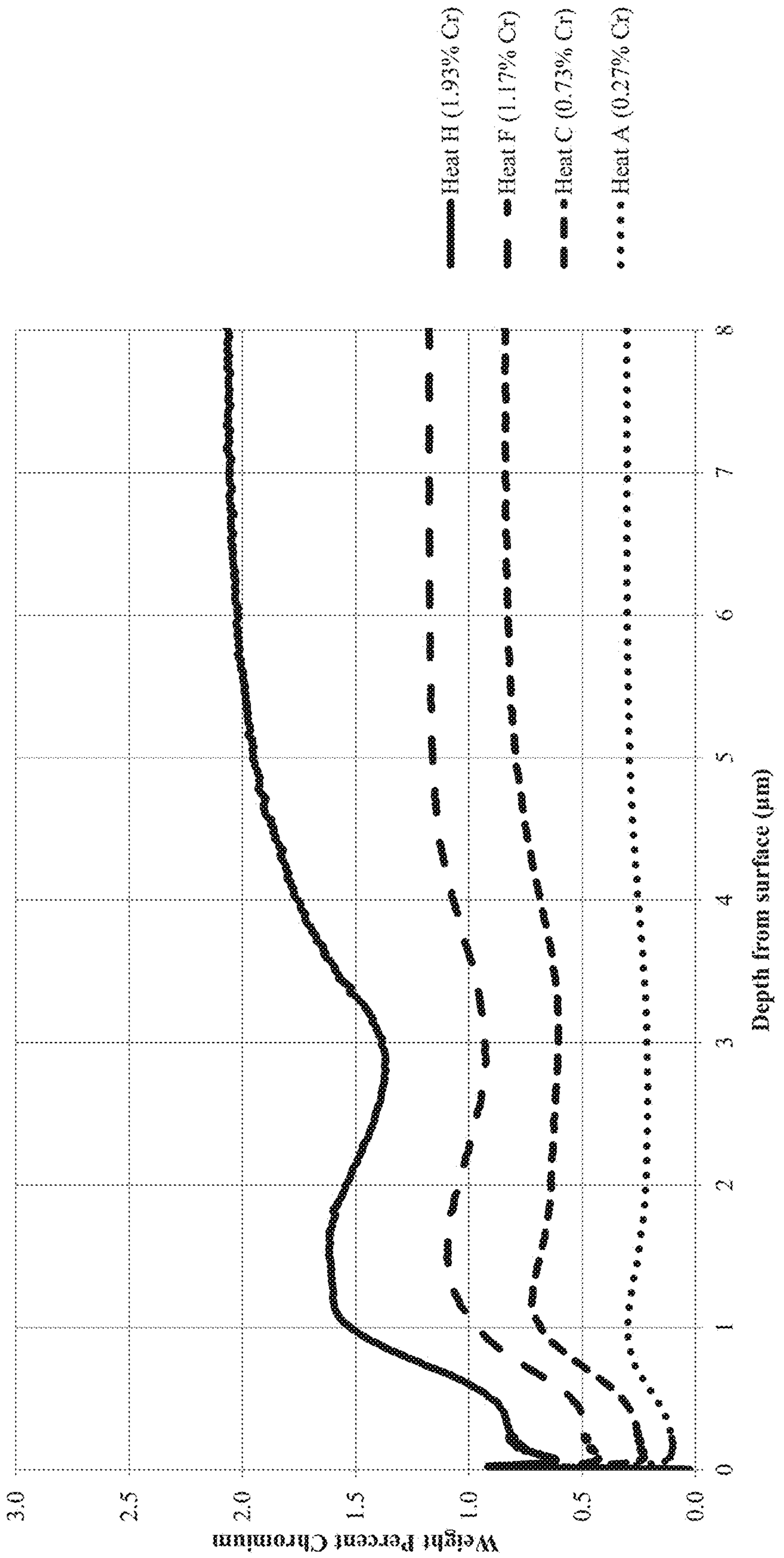

Figure 4: GDS Analysis of Silicon Profile of Annealed Surface
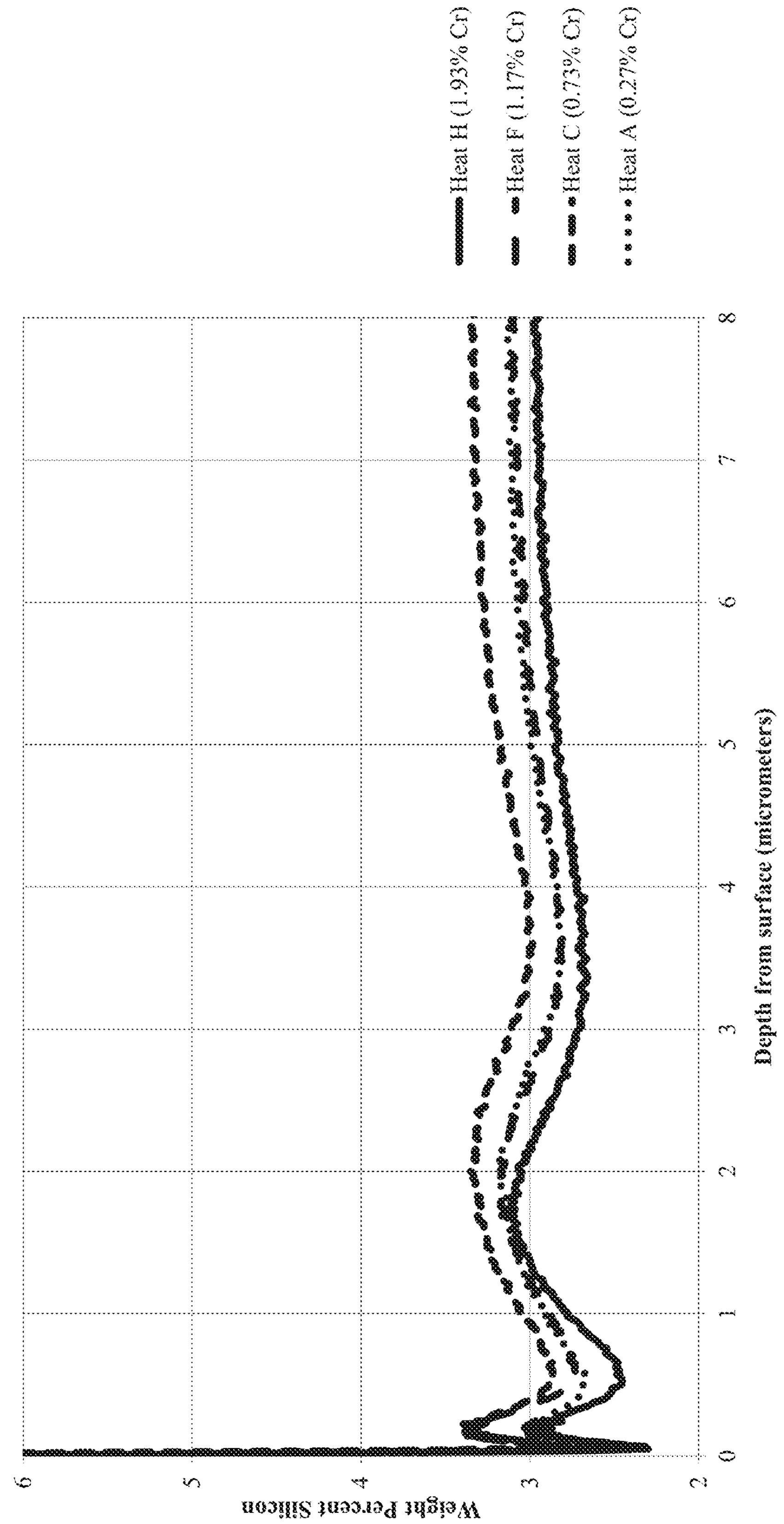

Figure 5: Micrographs of Fosterite Coating After High Temperature Annealing on Specimens Processed to 0.30 mm
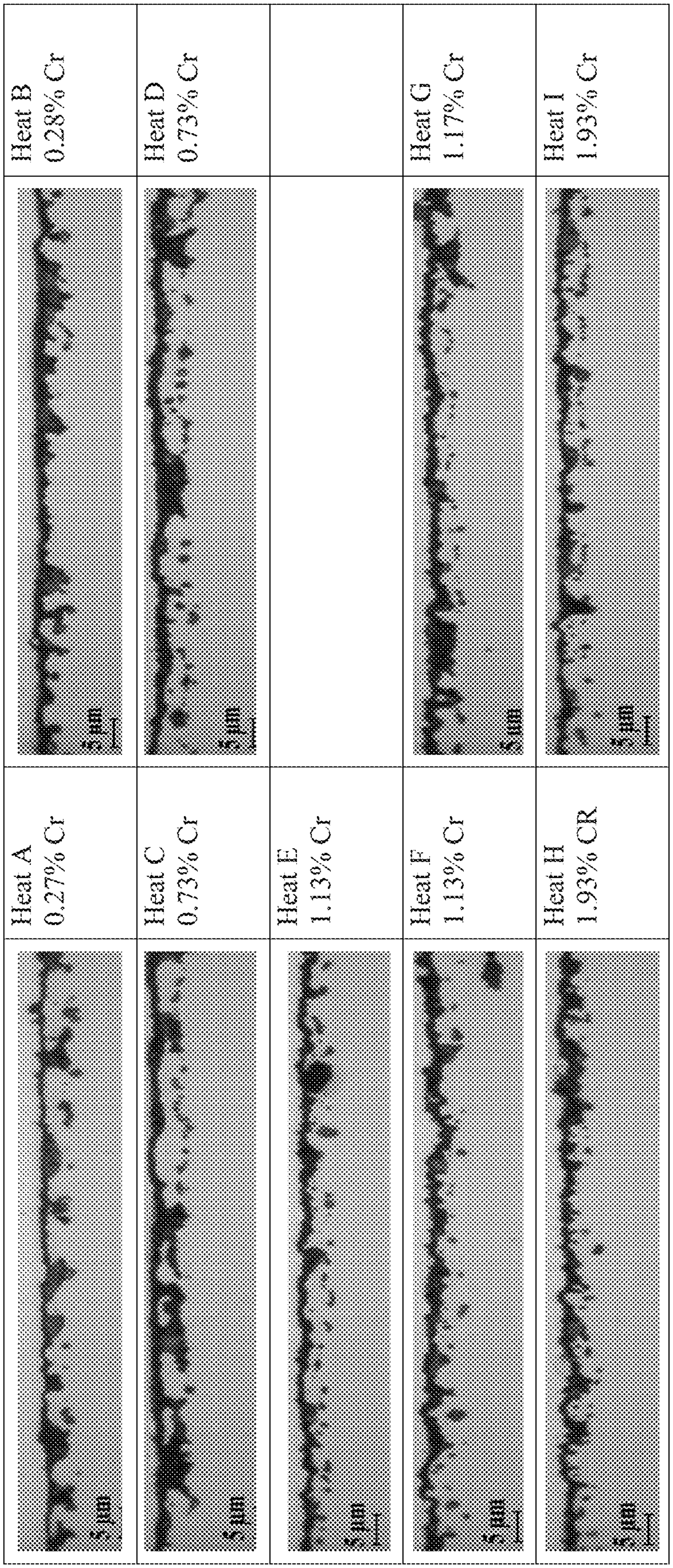

Figure 6: GDS Analysis of Oxygen Profile of Forsterite Coating
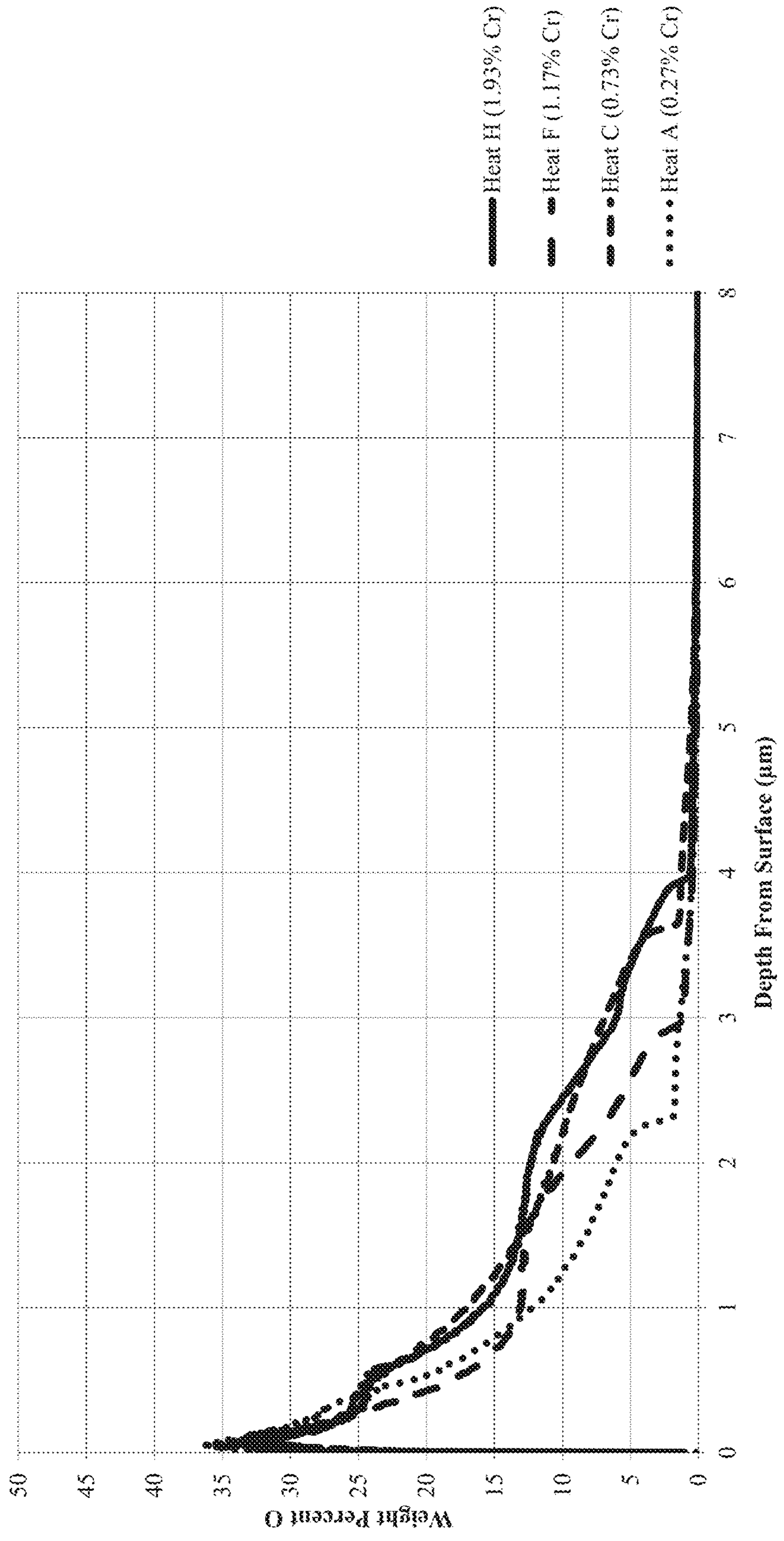

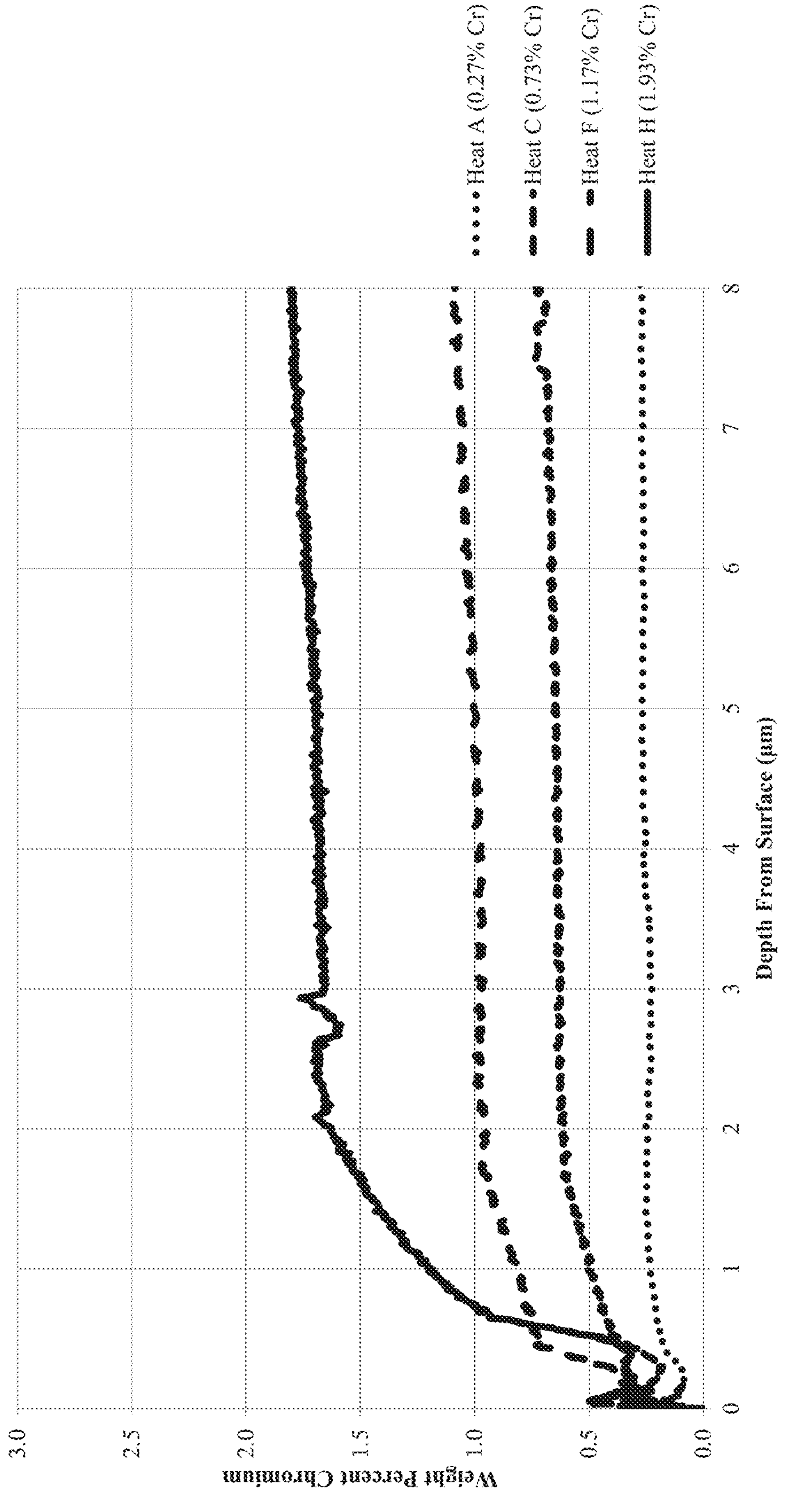
Figure 7: GDS Analysis of Chromium Profile of Forsterite Coating

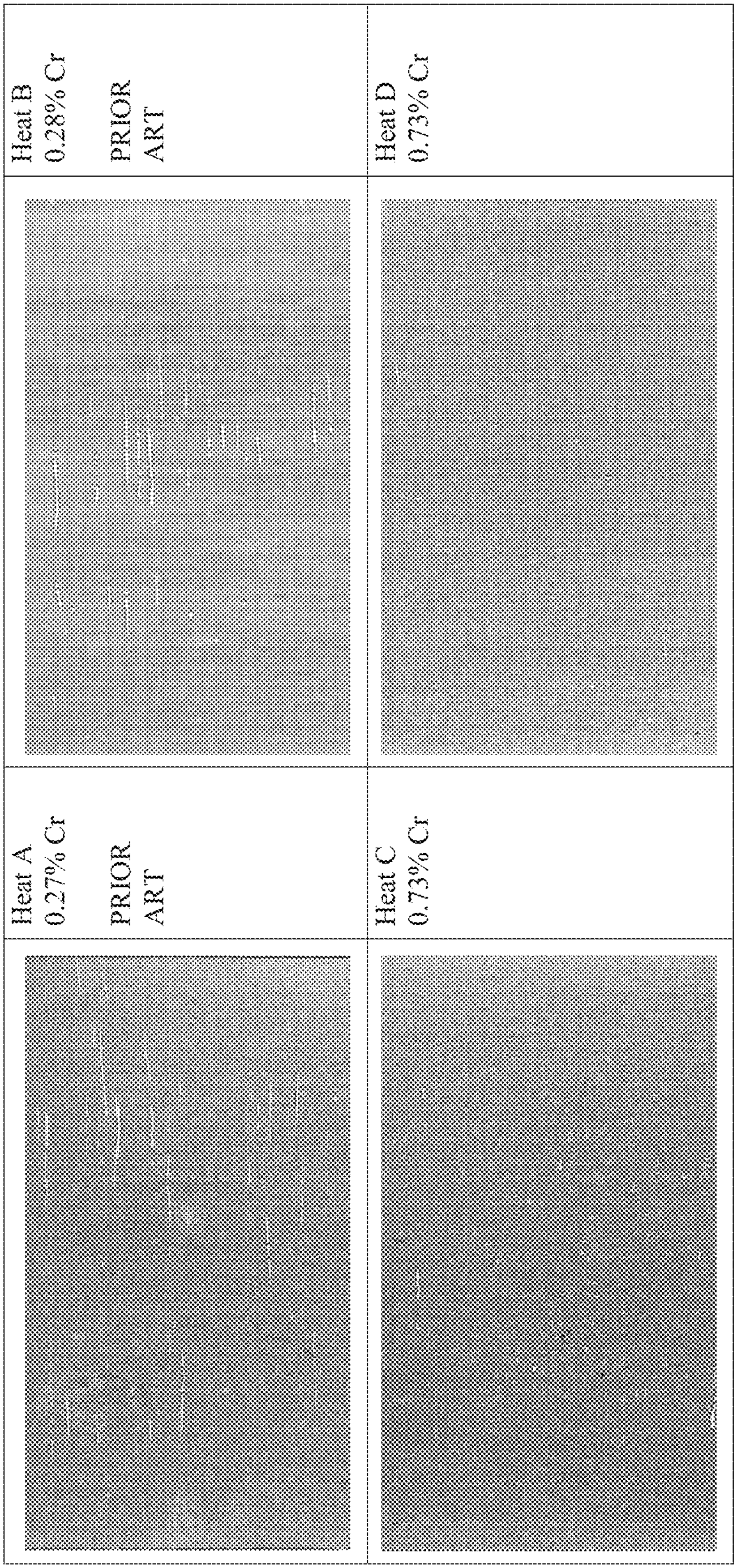
Figure 8: Secondary Coating Adherence Test Result (Laboratory Heats)
70mm wide samples -- 0.30mm final thickness

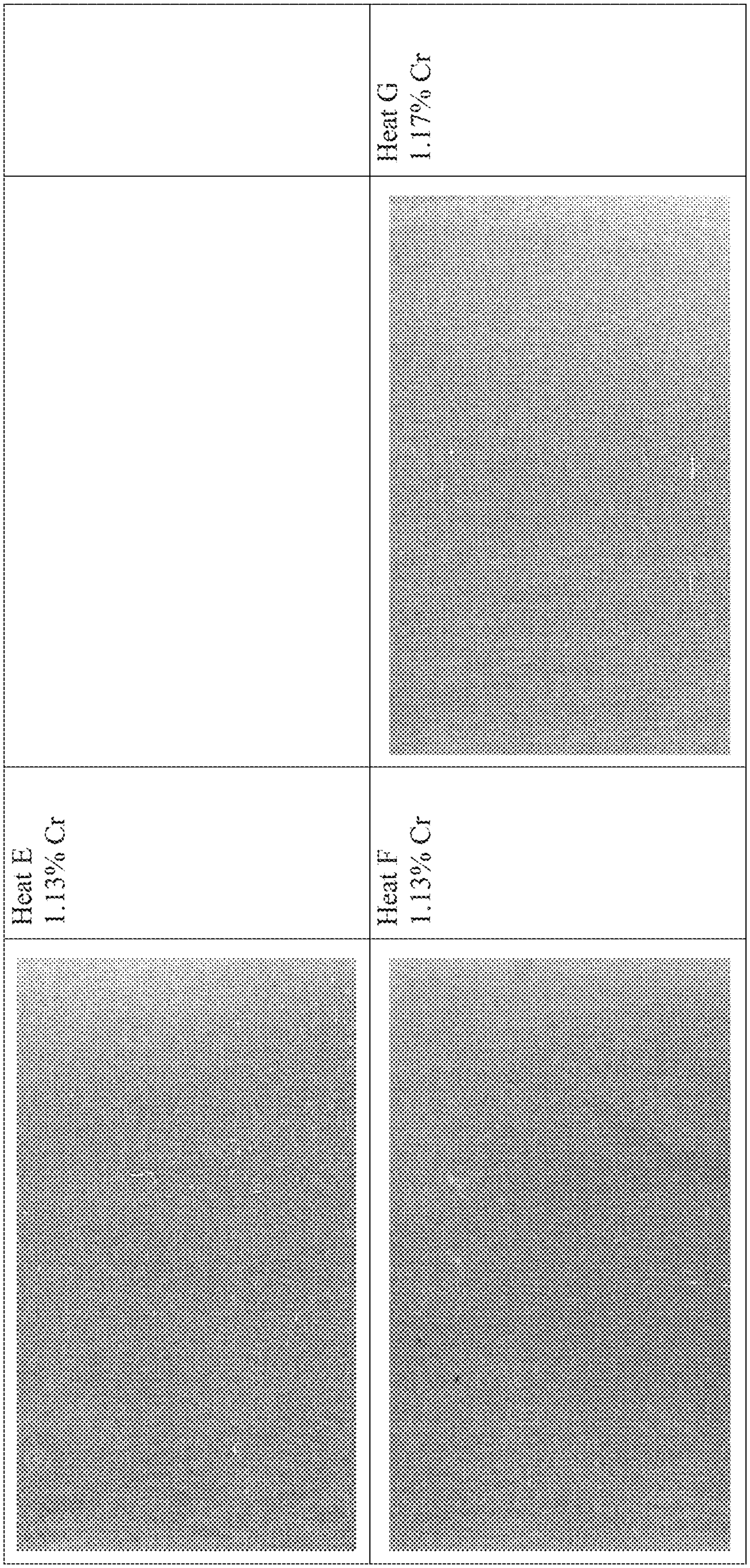
Figure 8: continued

Figure 8: continued
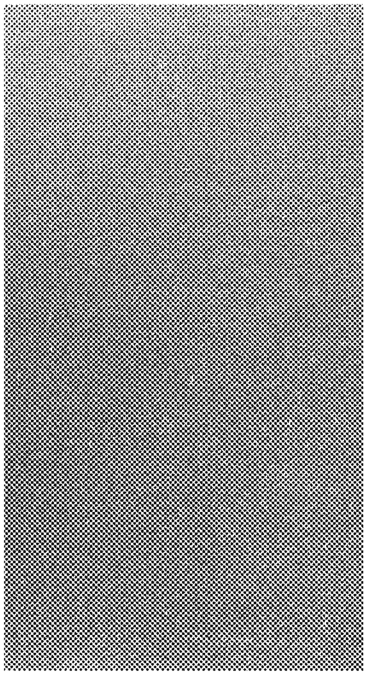
Heat H
1.93% CR
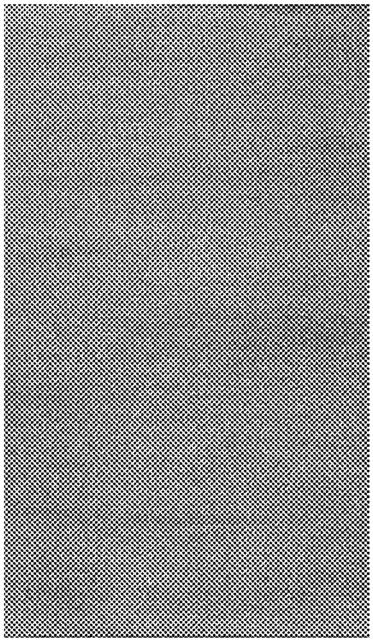
Heat I
1.93% Cr

Figure 9: 1.7T Core Loss After Secondary Coating
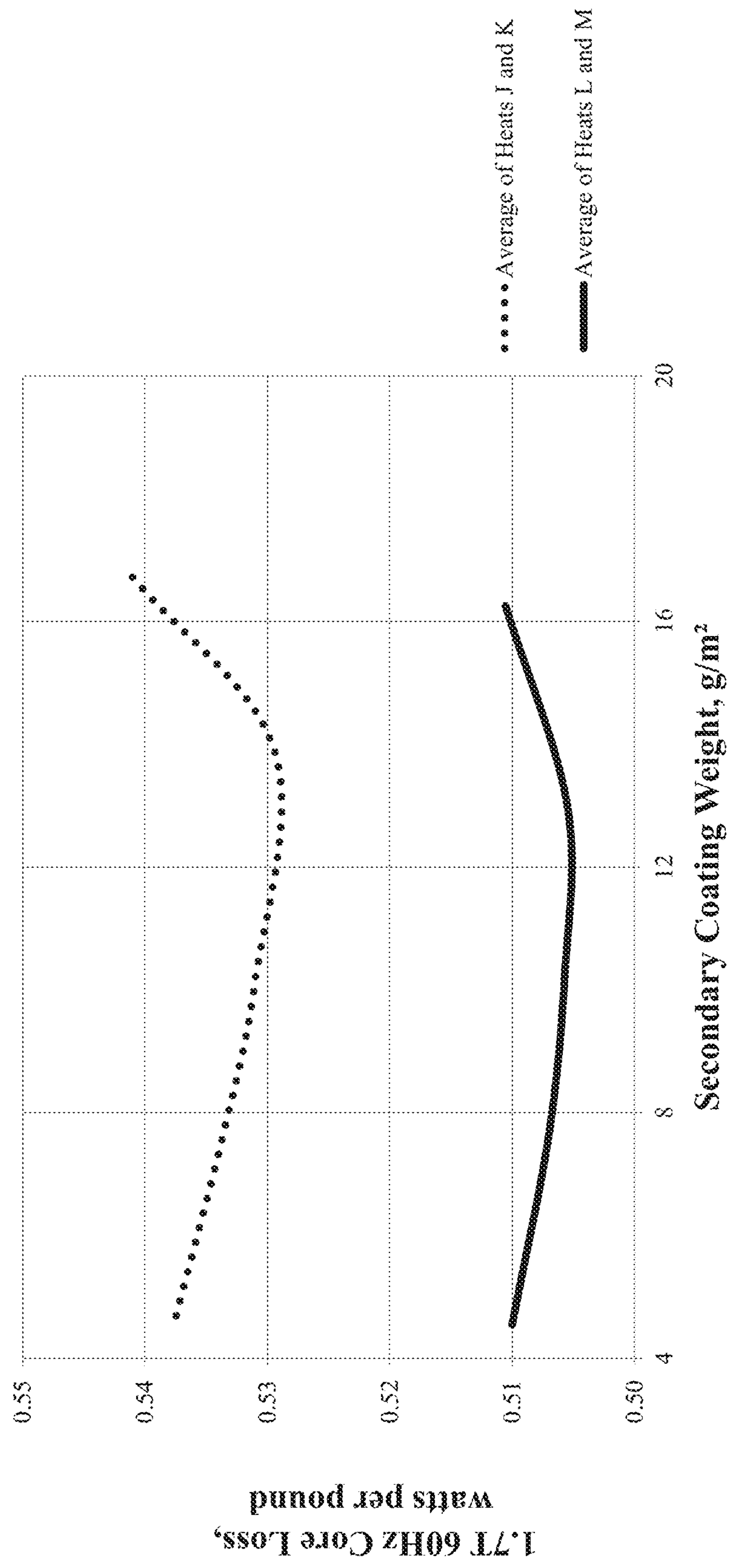

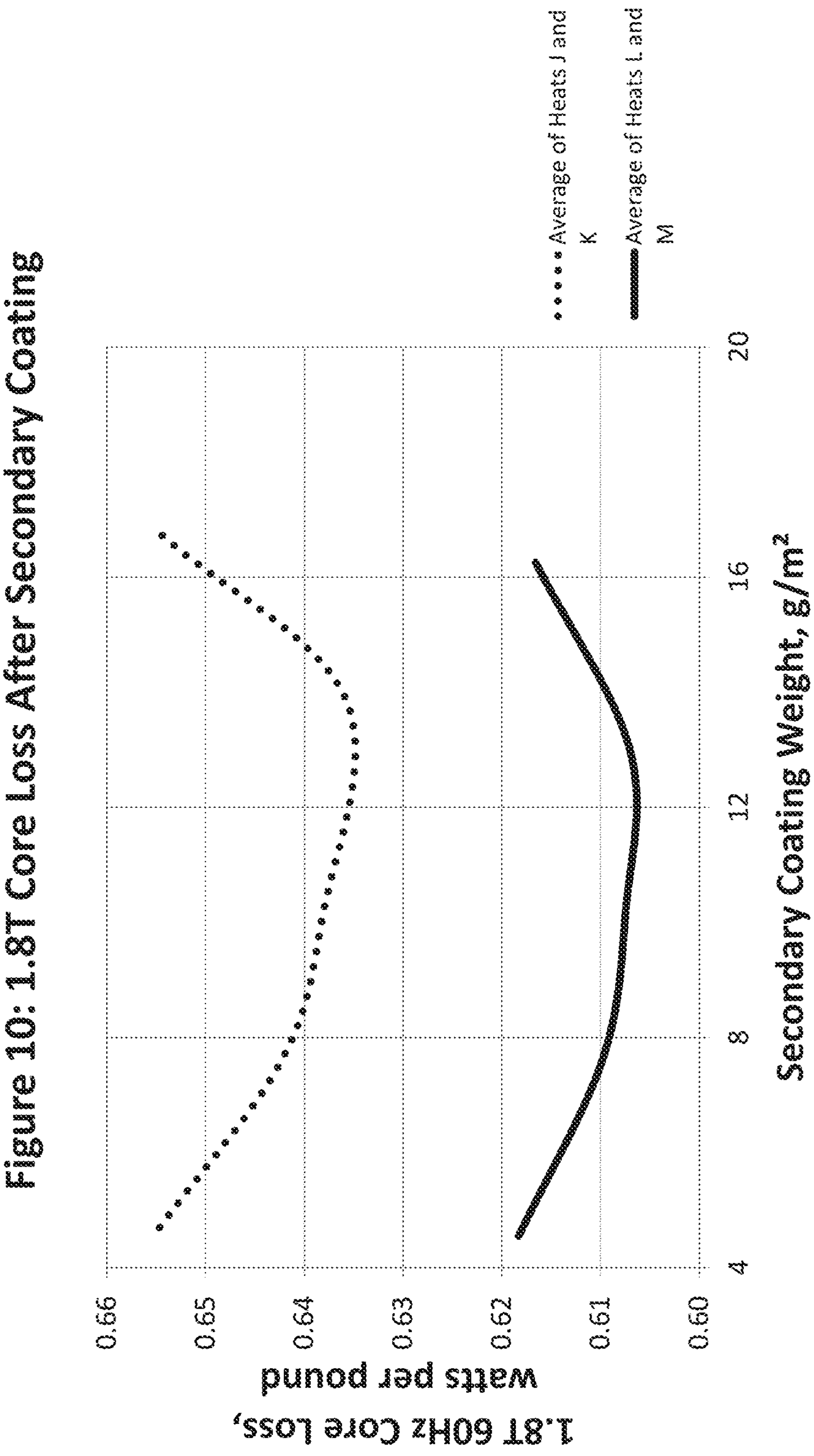
Figure 10: 1.8T Core Loss After Secondary Coating
1.8T 60Hz Core Loss, watts per pound
0.66
0.65
0.64
0.63
0.62
0.61
0.60
4
8
12
16
20
Secondary Coating Weight, g/m2
Average of Heats J and K
Average of Heats L and M Figure 11: Improvement in 1.7T Core Loss Observed After Secondary Coating
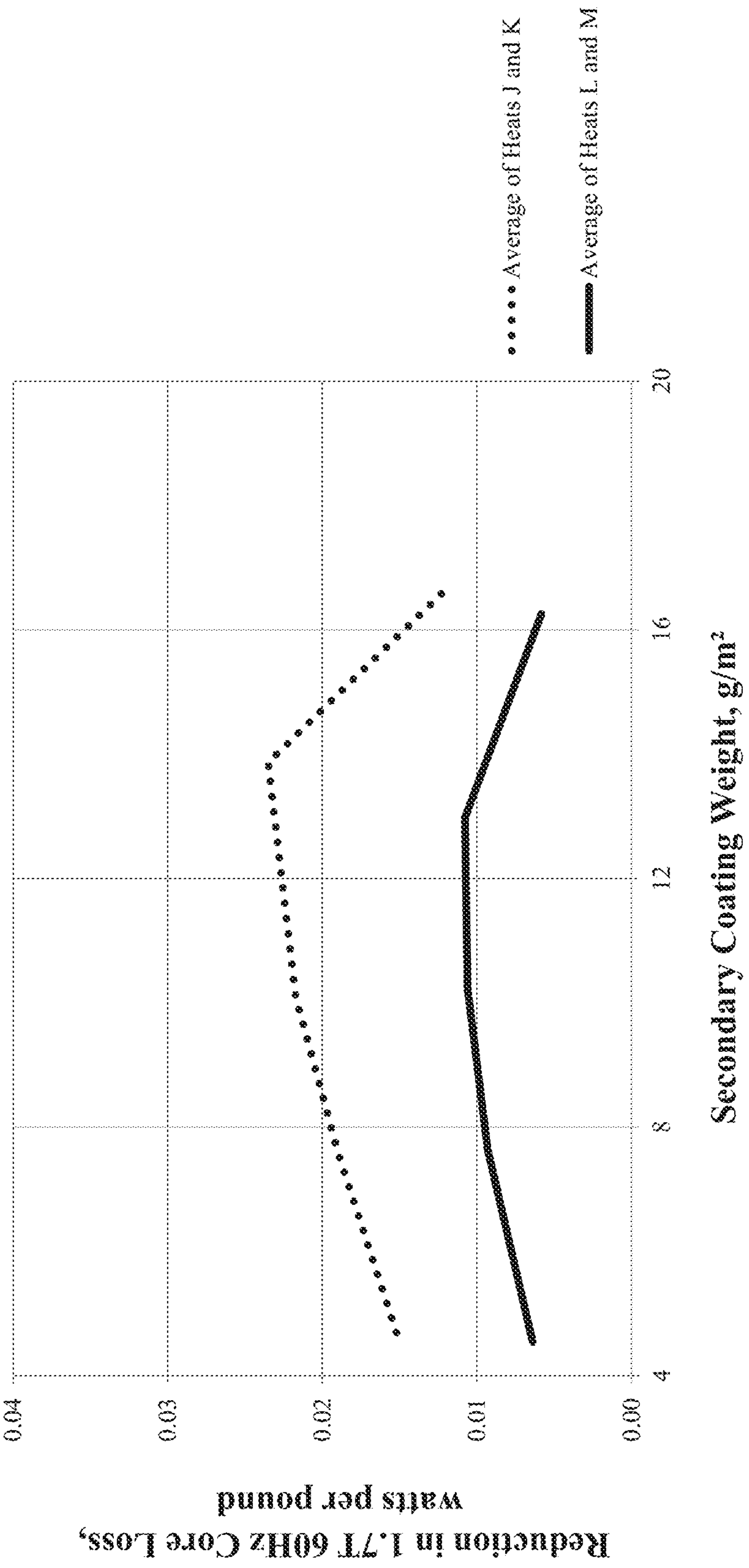

Figure 12: Improvement in 1.8T Core Loss Observed After Secondary Coating
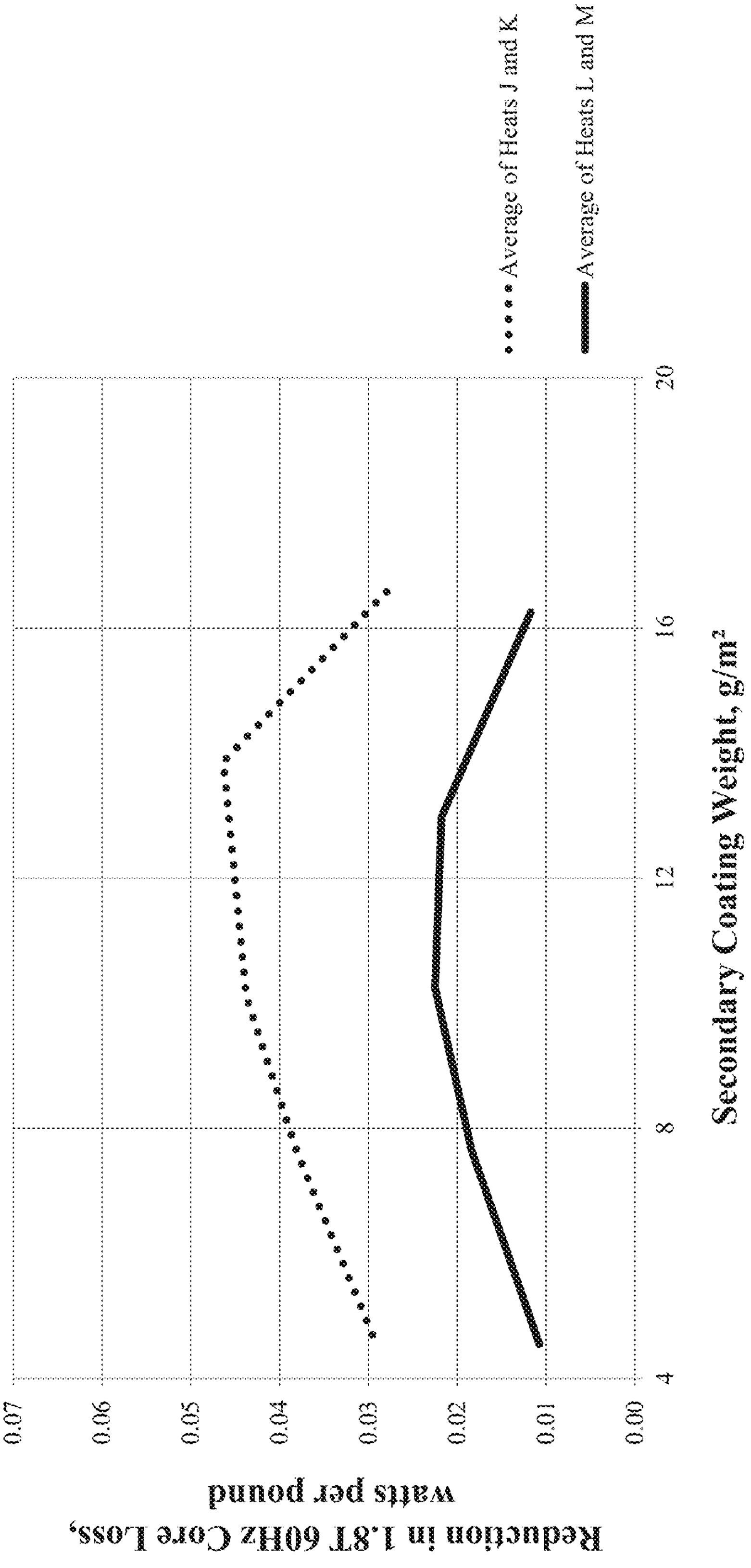

Figure 13: GDS Analysis of Oxygen Profile Of Annealed Surface
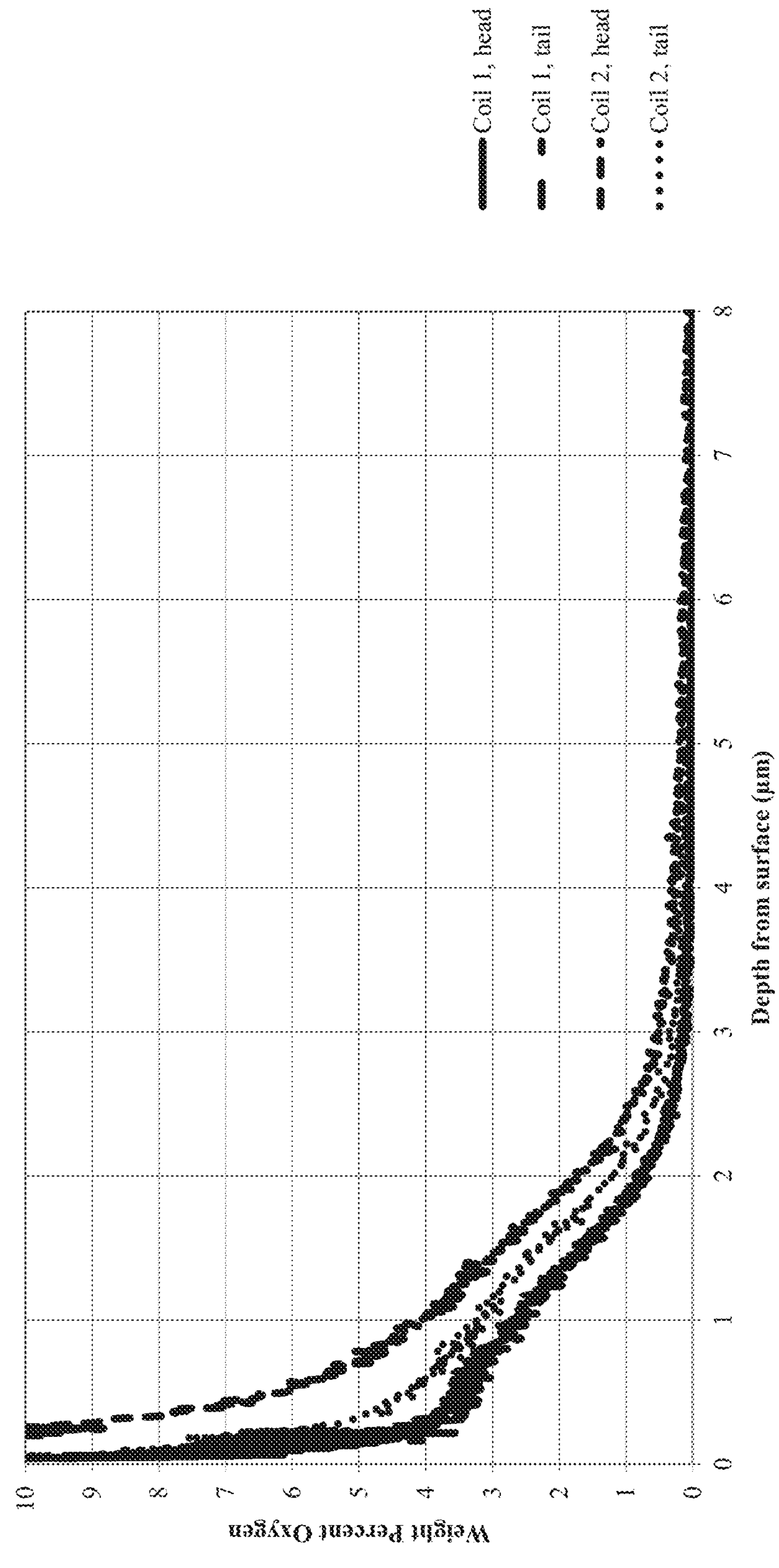

Figure 14: GDS Analysis of Chromium Profile of Annealed Surface
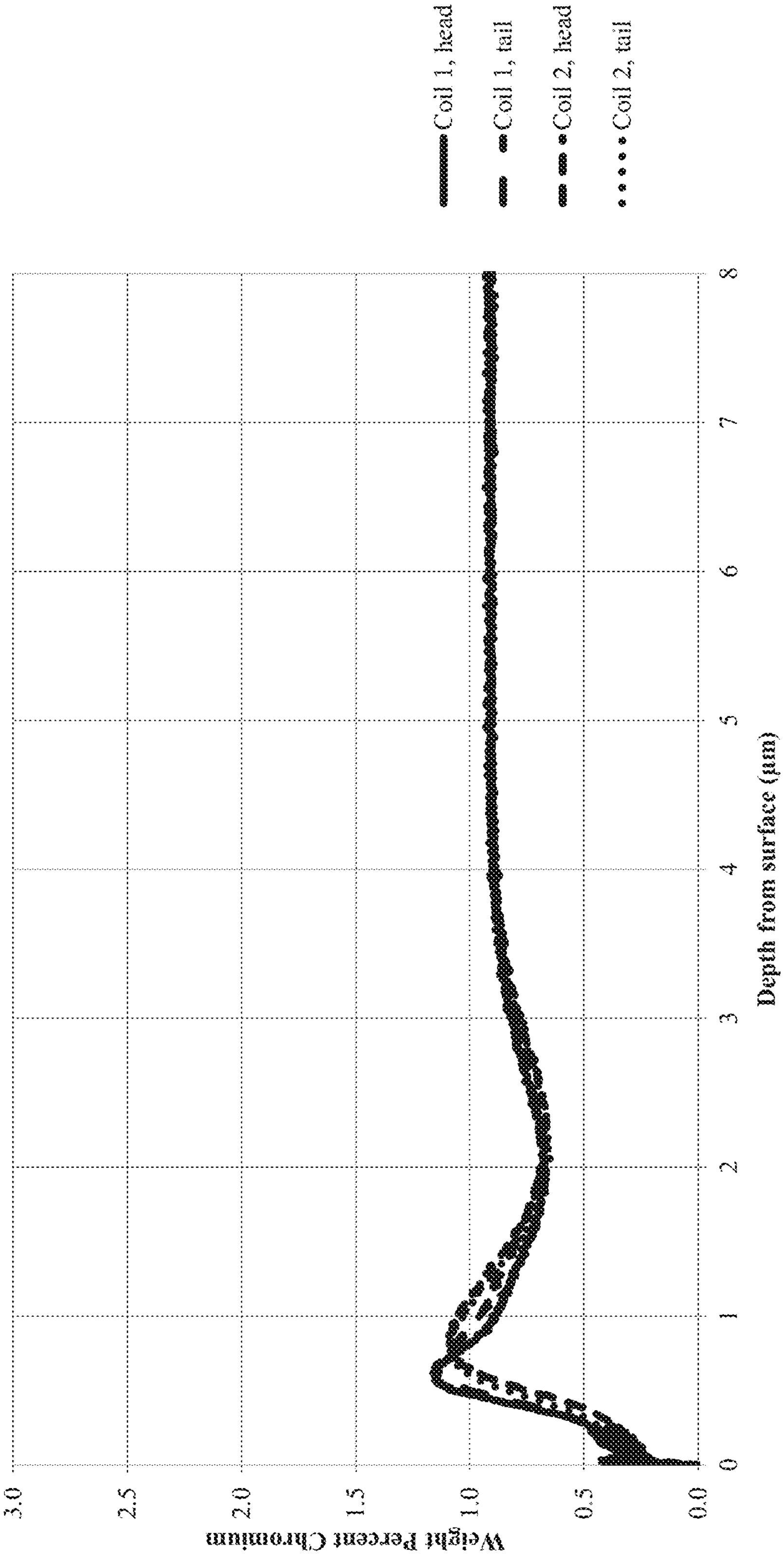

Figure 15: GDS Analysis of Oxygen Profile of Forsterite Coating
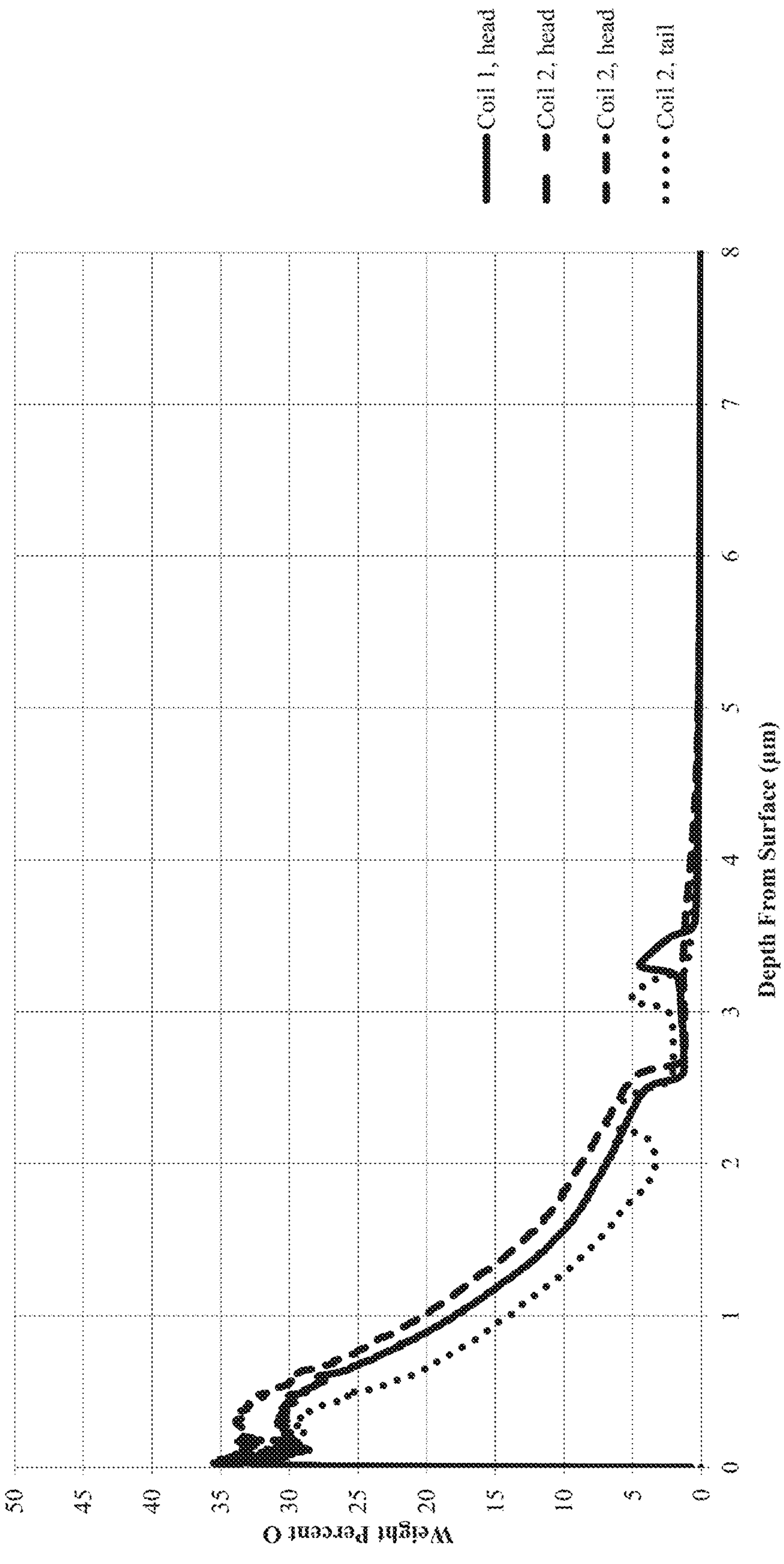

Figure 16: GDS Analysis of Chromium Profile of Forsterite Coating
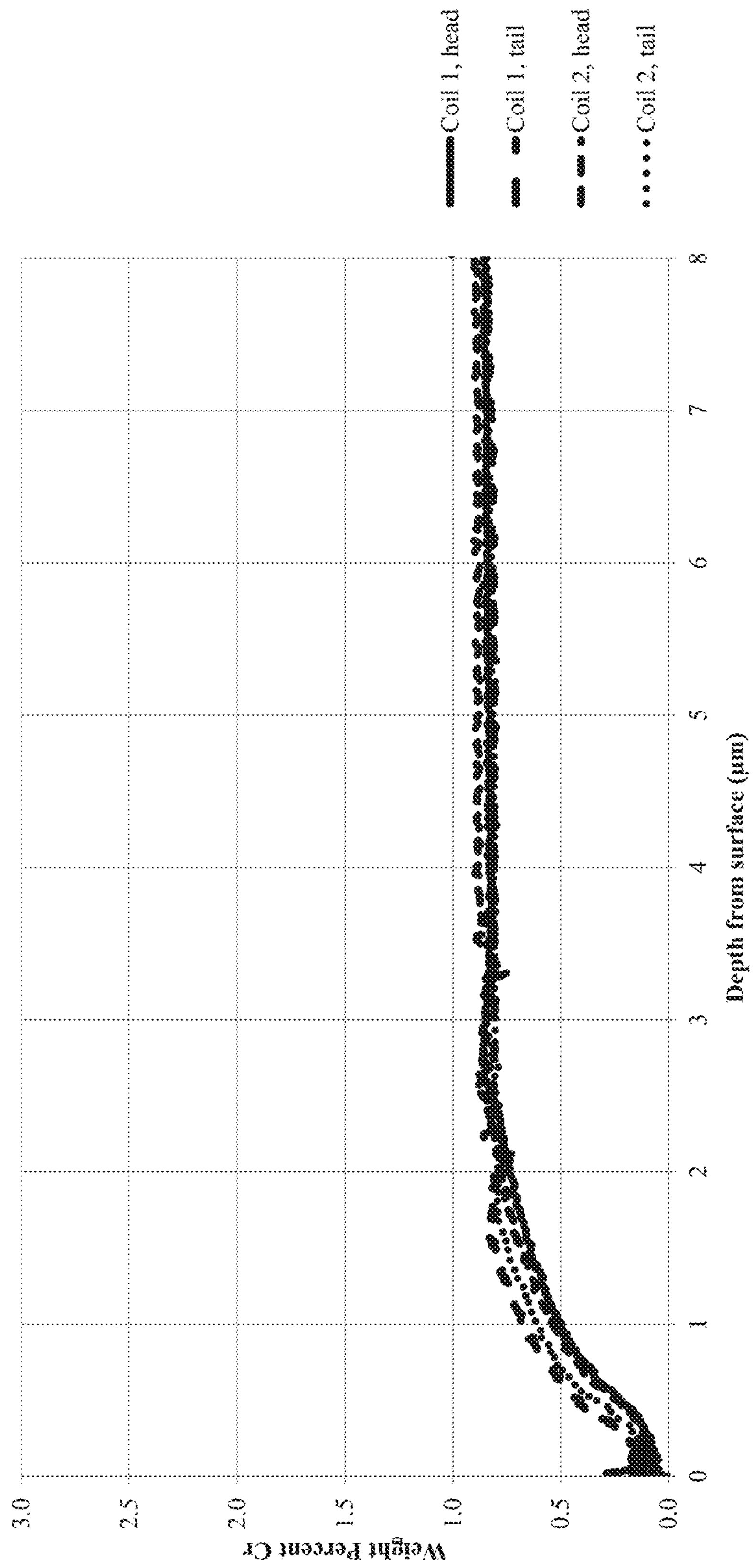

GRAIN ORIENTED ELECTRICAL STEEL WITH IMPROVED FORSTERITE COATING CHARACTERISTICS

PRIORITY

This application is a divisional application of U.S. patent application Ser. No. 14/468,963, entitled "Grain Oriented Electrical Steel with Improved Forsterite Coating Characteristics," filed on Aug. 26, 2014," and it claims priority to U.S. Provisional Patent Application Ser. No. 61/870,332, entitled "Method of Producing a High Permeability Grain Oriented Silicon Steel Sheet With Improved Forsterite Coating Characteristics," filed on Aug. 27, 2013, the disclosure of each is incorporated by reference herein.

BACKGROUND

In the course of manufacturing grain oriented silicon-iron electrical steels, a forsterite coating is formed during the high temperature annealing process. Such forsterite coatings are well-known and widely used in prior art methods for the production of grain oriented electrical steel. Such coatings are variously referred to in the art as a "glass film", "mill glass", "mill anneal" coating or other like terms and defined by ASTM specification A 976 as a Type C-2 insulation coating.

A forsterite coating is formed from the chemical reaction of the oxide layer formed on the electrical steel strip and an annealing separator coating, which is applied to the strip before a high temperature anneal. Annealing separator coatings are also well-known in the art, and typically comprise a water based magnesium oxide slurry containing other materials to enhance its function.

After the annealing separator coating has dried, the strip is typically wound into a coil and annealed in a batch-type box anneal process where it undergoes the high temperature annealing process. During this high temperature annealing process, in addition to the forsterite coating forming, a cube-on-edge grain orientation in the steel strip is developed and the steel is purified. There are a wide a variety of procedures for this process step which are well established in the art. After the high temperature annealing process is completed, the steel is cooled and the strip surface is cleaned by well-known methods that remove any unreacted or excess annealing separator coating.

In most cases, an additional coating is then applied onto the forsterite coating. Such additional coatings are described in ASTM specification A 976 as a Type C-5 coating, and often described as a "C-5 over C-2" coating. Among other things, a C-5 coating (a) provides additional electrical insulation needed for very high voltage electrical equipment which prevents circulating currents and, thereby, higher core losses, between individual steel sheets within the magnetic core; (b) places the steel strip in a state of mechanical tension which lowers the core loss of the steel sheet and improves the magnetostriction characteristic of the steel sheet which reduces vibration and noise in finished electrical equipment. Type C-5 insulation coatings are variously referred to in the art as "high stress," "tension effect," or "secondary" coatings. Because they are typically transparent or translucent, these well-known C-5 over C-2 coatings, as used on grain oriented electrical steel sheets, require a high degree of cosmetic uniformity and a high degree of physical adhesion in the C-2 coating. The combination of the C-5 and C-2 coatings provide a high degree of tension to the finished steel strip product, improving the magnetic properties of the steel strip. As a result, improvements in both the forsterite coating and applied secondary coating have been of great interest in the art.

SUMMARY

Increasing the chromium content of the steel substrate to a level greater than or equal to about 0.45 weight percent (wt %) produced a much improved forsterite coating with superior and more uniform coloration, thickness and adhesion. Moreover, the so-formed forsterite coating provides greater tension thus reducing the relative importance of the C-5 secondary coating.

BRIEF DESCRIPTION OF THE DRAWINGS

FIG. 1 depicts micrographs of surface oxide and oxygen content of laboratory-produced electrical steel compositions prior to high temperature annealing to form a forsterite coating.

FIG. 2 depicts a graph of a glow discharge spectrometric (GDS) analysis of the oxygen profile in the electrical steels of FIG. 1 prior to high temperature annealing.

FIG. 3 depicts a graph of a GDS analysis of the chromium profile in the electrical steels of FIG. 1 prior to high temperature annealing.

FIG. 4 depicts a graph of a GDS analysis of the silicon profile in the electrical steels of FIG. 1 prior to high temperature annealing.

FIG. 5 depicts micrographs of the forsterite coating formed on laboratory-produced electrical steel compositions after high temperature annealing.

FIG. 6 depicts a graph of a GDS analysis of the oxygen profile in the electrical steels of FIG. 5 after high temperature annealing.

FIG. 7 depicts a graph of a GDS analysis of the chromium profile in the electrical steels of FIG. 5 after high temperature annealing.

FIG. 8 depicts photographs of coating adherence test samples of laboratory-produced electrical steel compositions with a C-5 over C-2 coating.

FIG. 9 depicts a graph of the relative core loss of electrical steel compositions with C-5 over C-2 coating measured at 1.7 T.

FIG. 10 depicts a graph of the relative core loss of electrical steel compositions with C-5 over C-2 coating measured at 1.8 T.

FIG. 11 depicts a graph of the relative improvement in core loss of electrical steel composition with C-5 over C-2 coating measured at 1.7 T.

FIG. 12 depicts a graph of the relative improvement in core loss of electrical steel composition with C-5 over C-2 coating measured at 1.8 T.

FIG. 13 depicts a GDS analysis of the oxygen profile in mill-produced electrical steel of FIG. 12 prior to high temperature annealing.

FIG. 14 depicts a graph of a GDS analysis of the chromium profile in mill-produced electrical steel of FIG. 12 prior to high temperature annealing.

FIG. 15 depicts a GDS analysis of the oxygen profile in mill-produced electrical steel of FIG. 12 after high temperature annealing.

FIG. 16 depicts a graph of a GDS analysis of the chromium profile in the electrical steels of FIG. 12 after high temperature annealing.

DETAILED DESCRIPTION

In the typical industrial manufacturing methods for grain oriented electrical steels, steels are melted to specific and often proprietary compositions. In most cases, the steel melt includes small alloying additions of C, Mn, S, Se, Al, B and N along with the major constituents of Fe and Si. The steel melt is typically cast into slabs. The cast slabs can be subjected to slab reheating and hot rolling in one or two steps before being rolled into a 1-4 mm (typically 1.5-3 mm) strip for further processing. The hot rolled strip may be hot band annealed before cold rolling to final thicknesses ranging from 0.15-0.50 mm (typically 0.18-0.30 mm). The process of cold rolling is usually conducted in one or more steps. If more than two or more cold rolling steps are used, there is typically an annealing step between each cold rolling step. After cold rolling is completed, the steel is decarburization annealed in order to (a) provide a carbon level sufficiently low to prevent magnetic aging in the finished product; and (b) oxidize the surface of the steel sheet sufficiently to facilitate formation of the forsterite coating.

The decarburization annealed strip is coated with magnesia or a mixture of magnesia and other additions which coating is dried before the strip is wound into a coil form. The magnesia coated coil is then annealed at a high temperature (1100° C.-1200° C.) in a $H_2$—$N_2$ or $H_2$ atmosphere for an extended time. During this high temperature annealing step, the properties of the grain oriented electrical steel are developed. The cube-on-edge, or (110)[001], grain orientation is developed, the steel is purified as elements such as S, Se and N are removed, and the forsterite coating is formed. After high temperature annealing is completed, the coil is cooled and unwound, cleaned to remove any residue from magnesia separator coating and, typically, a C-5 insulation coating is applied over the forsterite coating.

The use of chromium additions for the production of grain oriented electrical steels is taught in U.S. Pat. No. 5,421,911, entitled "Regular Grain Oriented Electrical Steel Production Process, issued Jun. 6, 1995; U.S. Pat. No. 5,702,539, entitled "Method for Producing Silicon-Chromium Grain Oriented Electrical Steel, issued Dec. 30, 1997; and U.S. Pat. No. 7,887,645, entitled High Permeability Grain Oriented Electrical Steel, issued Feb. 15, 2011. The teachings of each of these patents are incorporated herein by reference. Chromium additions are employed to provide higher volume resistivity, enhance the formation of austenite, and provide other beneficial characteristics in the manufacture of the grain oriented electrical steel. In commercial practice, chromium has been used in the range of 0.10 wt % to 0.41 wt %, most typically at 0.20 wt % to 0.35 wt %. No beneficial effect of chromium on the forsterite coating was apparent in this commercial range. In fact, other prior art has reported that chromium degrades formation of the forsterite coating on the grain oriented electrical steel sheet. For example, US Patent Application Serial No. 20130098508, entitled "Grain Oriented Electrical Steel Sheet and Method for Manufacturing Same," published Apr. 25, 2013, teaches that the optimal tension provided by the forsterite coating formed requires a chromium content of not more than 0.1 wt %.

In certain embodiments, electrical steel compositions having greater than or equal to about 0.45 wt % chromium in the steel melt were found to have improved forsterite coating adhesion and lower core loss in the finished electrical steel product after high temperature annealing. In still other embodiments, electrical steel compositions having about 0.45 wt % to about 2.0 wt % chromium in the steel melt were found to have improved forsterite coating adhesion and lower core loss in the finished electrical steel product after high temperature annealing. In other embodiments, electrical steel compositions having greater than or equal to about 0.7 wt % chromium in the steel melt were found to have improved forsterite coating adhesion and lower core loss in the finished electrical steel product after high temperature annealing. In still other embodiments, electrical steel compositions having about 0.7 wt % to about 2.0 wt % chromium in the steel melt were found to have improved forsterite coating adhesion and lower core loss in the finished electrical steel product after high temperature annealing. In other embodiments, electrical steel compositions having greater than or equal to about 1.2 wt % chromium in the steel melt were found to have improved forsterite coating adhesion and lower core loss in the finished electrical steel product after high temperature annealing. In still other embodiments, electrical steel compositions having about 1.2 wt % to about 2.0 wt % chromium in the steel melt were found to have improved forsterite coating adhesion and lower core loss in the finished electrical steel product after high temperature annealing. In each case, other than the increased chromium content, the electrical steel compositions were typical of those used in the industry.

In certain embodiments, electrical steels having chromium concentrations greater than or equal to about 0.7 wt % at a depth of 0.5-2.5 μm from surfaces of the decarburization annealed steel sheet prior to high temperature annealing have improved forsterite coating adhesion and lower core loss in the finished electrical steel product after high temperature annealing. In certain embodiments, electrical steels having chromium concentrations greater than or equal to about 0.7 wt % at a depth of 0.5-2.5 μm from the surfaces of the decarburization annealed steel sheet, and oxygen concentrations in the forsterite-coated electrical steel sheet greater than or equal to about 7.0 wt % at a depth of 2-3 μm from the surfaces of the high temperature annealed steel sheet have improved forsterite coating adhesion and lower core loss in the finished electrical steel product after high temperature annealing. In each case, other than the increased chromium content, the electrical steel compositions were typical of those used in the industry.

In certain embodiments, the chromium concentration, as measured after decarburization annealing and before high temperature annealing, was found to be greater in a surface region, defined by a depth of less than or equal to 2.5 μm from the surface of the sheet, than in the bulk region of the sheet, defined by a depth greater than 2.5 μm from the surface. Surprisingly, it was determined that this chromium enrichment, which is partitioning of the chromium during processing prior to high temperature annealing, is no longer present after high temperature annealing. While not being limited to any theory, it is believed that this diminution in chromium concentration nearer to the surface is a result of interaction with the forsterite coating as it forms and plays a role in the improved forsterite coating properties.

Electrical steel containing chromium compositions in the range of 0.7 wt % to 2.0 wt % were prepared by methods known in the art. These compositions were evaluated to determine the effects of the chromium concentration on decarburization annealing, oxide layer ("fayalite") formation in decarburization annealing, mill glass formation after high temperature annealing, and secondary coating adherence. The decarburized sheets were magnesia coated, high temperature annealed and the forsterite coating was evaluated. Steels containing 0.70% or more chromium showed improved secondary coating adhesion as the melt chromium level increased.

A series of tests were made. First, the as-decarburized oxide layer was examined. Metallographic analysis showed the oxide layer was similar in thickness across the chromium range while chemical analysis showed that total-oxygen level after decarburization annealing was the same to slightly higher. GDS analysis of the oxide layer showed that a chromium-rich peak developed in the near-surface (0.5-2.5 μm) layer of the sheet surfaces, which increased as the melt chromium level rose. Second, the forsterite coating was examined. Metallographic analysis showed that as the chromium content of the steel sheet was increased, the forsterite coating formed on the steel surface was thicker, more continuous, more uniform in coloration, and developed a more extensive subsurface "root" structure. An improved "root" structure is known to provide improved coating adhesion. Third and last, the samples coated with CARLITE® 3 coating (a high-tension C-5 secondary coating commercially used by AK Steel Corporation, West Chester, Ohio) and tested for adherence. The results showed significant improvement in coating adhesion as the chromium level was increased.

Example 1

Laboratory-scale heats were made with compositions exemplary of the prior art (Heats A and B) and compositions of the present embodiments (Heats C through I).

TABLE I

Summary of Heat Compositions After Melting and After Decarburization Annealing Prior to MgO Coating

| | Melt Chemistry, weight percent | | | | | | | | After Annealing | | | | |
|---|---|---|---|---|---|---|---|---|---|---|---|---|---|
| | | | | | | | | | 0.23 mm thickness | | 0.30 mm thickness | | |
| | | | | | | | | | | Total | | Total | |
| Heat | Si | C | Cr | Mn | N | S | Al | Sn | % C | % O | % C | % O | Remarks |
| A | 2.99 | 0.045 | 0.28 | 0.070 | 0.010 | 0.027 | 0.037 | 0.11 | 0.0012 | 0.105 | 0.0008 | 0.100 | Prior art |
| B | 2.94 | 0.053 | 0.27 | 0.067 | 0.010 | 0.027 | 0.031 | 0.10 | 0.0009 | 0.091 | 0.0010 | 0.099 | |
| C | 3.09 | 0.049 | 0.73 | 0.073 | 0.012 | 0.029 | 0.042 | 0.11 | 0.0009 | 0.096 | 0.0011 | 0.100 | Embodiment |
| D | 3.06 | 0.056 | 0.73 | 0.070 | 0.012 | 0.030 | 0.039 | 0.11 | 0.0012 | 0.095 | 0.0011 | 0.097 | |
| E | 3.00 | 0.038 | 1.13 | 0.071 | 0.012 | 0.030 | 0.037 | 0.11 | 0.0009 | 0.098 | 0.0012 | 0.110 | |
| F | 3.06 | 0.039 | 1.13 | 0.070 | 0.012 | 0.028 | 0.030 | 0.11 | 0.0009 | 0.110 | 0.0008 | 0.120 | |
| G | 2.94 | 0.051 | 1.17 | 0.069 | 0.012 | 0.028 | 0.030 | 0.11 | 0.0014 | 0.094 | 0.0011 | 0.100 | |
| H | 2.98 | 0.028 | 1.93 | 0.068 | 0.014 | 0.028 | 0.039 | 0.11 | 0.0013 | 0.104 | 0.0011 | 0.120 | |
| I | 3.00 | 0.050 | 1.93 | 0.067 | 0.014 | 0.028 | 0.038 | 0.11 | 0.0048 | 0.098 | 0.0034 | 0.103 | |

The steel was cast into ingots, heated to 1050° C., provided with a 25% hot reduction and further heated to 1260° C. and hot rolled to produce a hot rolled strip having a thickness of 2.3 mm. The hot rolled strip was subsequently annealed at a temperature of 1150° C., cooled in air to 950° C. followed by rapid cooling at a rate of greater than 50° C. per second to a temperature below 300° C. The hot rolled and annealed strip was then cold rolled to final thickness of 0.23 mm or 0.30 mm. The cold rolled strip was then decarburization annealed by rapidly heating to 740° C. at a rate in excess of 500° C. per second followed by heating to a temperature of 815° C. in a humidified hydrogen-nitrogen atmosphere having a $H_2O/H_2$ ratio of nominally 0.40-0.45 to reduce the carbon level in the steel. The soak time at 815° C. allowed was 90 seconds for material cold rolled to 0.23 mm thickness and 170 seconds for material cold rolled to 0.30 mm thickness. After the decarburization annealing step was completed, samples were taken for chemical testing of carbon and surface oxygen and surface composition analysis using glow discharge spectrometry (GDS) to measure the composition and depth of the oxide layer. The strip was then coated with an annealing separator coating comprised of magnesium oxide containing 4% titanium oxide. The coated strip was then high temperature annealed by heating in an atmosphere of 75% $N_2$ 25% $H_2$ to a soak temperature of 1200° C. whereupon the strip was held for a time of at least 15 hours in 100% dry $H_2$. After cooling, the strip was cleaned and any unreacted annealing separator coating removed. Samples were taken to measure the uniformity, thickness, and composition of the forsterite coating. The specimens were subsequently coated with a tension-effect C-5 type secondary coating and tested for adherence using a single pass three-roll bend testing procedure using 19 mm (0.75-inch) forming rolls. The adherence of the coating was evaluated using the compression-side strip surface.

FIG. 1 shows the micrographs of the oxide layer by chromium content before high temperature annealing was conducted. FIGS. 2, 3, and 4, respectively, show the amounts (in weight percent) of oxygen, chromium, and silicon found in the annealed surface oxide layer. FIGS. 2 and 3 show the increase in oxygen and chromium content in the oxide layer at a depth between 0.5 and 2.5 μm beneath the sheet surface. FIG. 5 shows the micrographs of the forsterite coating formed during high temperature annealing by the reaction of the oxide layer and the annealing separator coating. An enhanced subsurface forsterite coating root structure is apparent as the chromium content of the steel was increased. FIG. 6 shows the GDS analysis of the oxygen profile of the forsterite coating which was used to measure the thickness and density of the forsterite coating. This data shows that the forsterite coating thickness and density were enhanced by the addition of chromium to the base metal of greater than 0.7 wt %. FIG. 7 shows the GDS analysis of the chromium profile of the forsterite coating.

FIG. 8 shows photographs of the specimens after secondary coating and coating adherence testing, which shows that adhesion improved dramatically as the chromium content was increased. The steel of the prior art, Heats A and B, shows coating delamination, as evidenced by the lines where the coating had peeled. In contrast, steel of Heats C through F show substantially reduced peeling with some spot flecking of the coating. Heats H and I shows substantially no peeling or flecking of the coating.

Example 2

To demonstrate the benefit on the core loss, industrial scale heats having compositions shown in Table II were made. Heats J and K are exemplary of the prior art and Heats L and M are compositions of the present embodiments.

TABLE II

| Summary of Heat Compositions | | | | | | | | | |
|---|---|---|---|---|---|---|---|---|---|
| Heat | Si | C | Cr | N | S | Mn | Al | Sn | Note |
| J | 3.08 | 0.0558 | 0.342 | 0.0084 | 0.0265 | 0.076 | 0.0299 | 0.117 | Prior Art |
| K | 3.07 | 0.0553 | 0.336 | 0.0084 | 0.0253 | 0.0752 | 0.0327 | 0.112 | |
| L | 3.05 | 0.0559 | 0.885 | 0.0105 | 0.0258 | 0.074 | 0.0348 | 0.118 | Embodiment |
| M | 3.04 | 0.0549 | 0.889 | 0.0099 | 0.0256 | 0.0728 | 0.0335 | 0.115 | |

The steel was continuously cast into slabs having a thickness of 200 mm. The slabs were heated to 1200° C., provided with a 25% hot reduction to a thickness of 150 mm, further heated to 1400° C. and rolled to produce a hot rolled steel strip having a thickness of 2.0 mm. The hot rolled steel strip was subsequently annealed at a temperature of 1150° C., cooled in air to 950° C. followed by rapid cooling at a rate of greater than 50° C. per second to a temperature below 300° C. The steel strip was then cold rolled directly to a final thickness of 0.27 mm, decarburization annealed by rapidly heating to 740° C. at a rate in excess of 500° C. per second followed by heating to a temperature of 815° C. in a humidified $H_2$—$N_2$ atmosphere having a $H_2O/H_2$ ratio of nominally 0.40-0.45 to reduce the carbon level in the steel to below 0.003% or less. As part of the evaluation, samples were secured for GDS analysis to compare with the work in Example 1.

The strip was coated with an annealing separator coating consisting primarily of magnesium oxide containing 4% titanium oxide. After the annealing separator coating was dried, the strip was wound into a coil and high temperature annealed by heating in a $H_2$—$N_2$ atmosphere to a soak temperature of nominally 1200° C. whereupon the strip was soaked for a time of at least 15 hours in 100% dry $H_2$. After high temperature annealing was completed, the coils were cooled and cleaned to remove any unreacted annealing separator coating and test material was secured to evaluate both the magnetic properties and characteristics of the forsterite coating formed in the high temperature anneal. The test material was then given a secondary coating using a tension-effect ASTM Type C-5 coating. The thickness of the secondary coating ranged from nominally 4 gm/m$^2$ to nominally 16 gm/m$^2$ (total applied to both surfaces) which measure was based on the weight increase of the specimen after the secondary coating was fully dried and fired. The specimens were then measured to determine the change in magnetic properties.

Table III summarizes the magnetic properties before and after applying a secondary coating over the forsterite coating. The improvement is clearly presented in FIGS. 9 and 10 which show the 60 Hz core loss measured at a magnetic induction of 1.7 T and 1.8 T, respectively, after application of a tension-effect secondary coating. Heats J and K of the prior art have significantly higher core loss than Heats L and M, which are embodiments of the present invention. Moreover, the composition of these embodiments results in a forsterite coating with superior technical characteristics. As FIGS. 11 and 12 show, these embodiments produce superior core loss and much greater consistency in core loss over the range of production variation in the secondary coating weights. Moreover, this ability to reduce the weight of the secondary coating results in an increased space factor, which is known to be an important steel characteristic in electrical machine design.

FIGS. 13 and 14 show the surface chemistry spectra for oxygen and chromium determined by GDS for the samples of Heats L and M taken during mill processing prior to high temperature annealing. The results are similar to those discussed in Example 1, that is, an increase in the oxygen and chromium content of the oxide layer was observed at certain depths beneath the surfaces of the steel sheet.

TABLE III

| Magnetic Properties Before and After Application of Secondary Coating | | | | | | | | | | | | | | |
|---|---|---|---|---|---|---|---|---|---|---|---|---|---|---|
| | Coil | Secondary | Magnetic Properties Before Application of Secondary Coating (Forsterite only) | | | | Magnetic Properties After Application of Secondary Coating (C-5 over C-2) | | | | Decrease in Core Loss for | | | |
| | End in | Coating Weight, | Magnetic Permeability | Core Loss, watts per pound | | | Magnetic Permeability | Core Loss, watts per pound | | | Secondary Coating, watts per pound | | | |
| Heat | HTA | g/m$^2$ | at H = 10 Oe | 15 kG | 17 kG | 18 kG | at H = 10 Oe | 15 kG | 17 kG | 18 kG | 15 kG | 17 kG | 18 kG | Remarks |
| J | Head | 4.5 | 1943 | 0.422 | 0.563 | 0.698 | 1939 | 0.410 | 0.546 | 0.665 | 0.012 | 0.017 | 0.033 | Prior art |
| | | 7.5 | 1944 | 0.424 | 0.564 | 0.693 | 1937 | 0.403 | 0.538 | 0.646 | 0.020 | 0.026 | 0.046 | |
| | | 9.9 | 1944 | 0.427 | 0.564 | 0.690 | 1936 | 0.409 | 0.543 | 0.648 | 0.018 | 0.021 | 0.041 | |
| | | 13.6 | 1944 | 0.427 | 0.564 | 0.694 | 1933 | 0.402 | 0.535 | 0.638 | 0.025 | 0.029 | 0.055 | |
| | | 16.4 | 1944 | 0.424 | 0.563 | 0.698 | 1929 | 0.407 | 0.543 | 0.654 | 0.017 | 0.020 | 0.044 | |
| | Tail | 4.8 | 1934 | 0.421 | 0.560 | 0.697 | 1931 | 0.407 | 0.543 | 0.667 | 0.014 | 0.016 | 0.030 | |
| | | 7.5 | 1933 | 0.420 | 0.557 | 0.689 | 1928 | 0.405 | 0.542 | 0.659 | 0.014 | 0.015 | 0.030 | |
| | | 9.9 | 1934 | 0.422 | 0.560 | 0.698 | 1927 | 0.402 | 0.537 | 0.653 | 0.020 | 0.023 | 0.045 | |
| | | 13.7 | 1934 | 0.421 | 0.560 | 0.695 | 1923 | 0.402 | 0.539 | 0.653 | 0.019 | 0.021 | 0.042 | |
| | | 16.6 | 1934 | 0.422 | 0.560 | 0.693 | 1919 | 0.413 | 0.555 | 0.678 | 0.009 | 0.005 | 0.014 | |
| K | Head | 4.7 | 1942 | 0.415 | 0.549 | 0.682 | 1938 | 0.403 | 0.533 | 0.647 | 0.013 | 0.016 | 0.035 | |
| | | 7.6 | 1942 | 0.415 | 0.548 | 0.674 | 1935 | 0.400 | 0.529 | 0.636 | 0.015 | 0.019 | 0.038 | |
| | | 10.2 | 1941 | 0.416 | 0.548 | 0.681 | 1934 | 0.394 | 0.524 | 0.628 | 0.022 | 0.024 | 0.052 | |
| | | 13.9 | 1941 | 0.415 | 0.549 | 0.681 | 1931 | 0.395 | 0.524 | 0.628 | 0.020 | 0.025 | 0.053 | |
| | | 16.9 | 1942 | 0.416 | 0.548 | 0.679 | 1928 | 0.402 | 0.536 | 0.645 | 0.014 | 0.012 | 0.034 | |
| | Tail | 4.8 | 1938 | 0.412 | 0.539 | 0.660 | 1933 | 0.399 | 0.527 | 0.640 | 0.012 | 0.012 | 0.021 | |
| | | 7.8 | 1938 | 0.411 | 0.539 | 0.654 | 1932 | 0.398 | 0.525 | 0.628 | 0.014 | 0.013 | 0.027 | |

TABLE III-continued

Magnetic Properties Before and After Application of Secondary Coating

| Heat | Coil End in HTA | Secondary Coating Weight, g/m$^2$ | Magnetic Properties Before Application of Secondary Coating (Forsterite only) Magnetic Permeability at H = 10 Oe | Core Loss, watts per pound 15 kG | 17 kG | 18 kG | Magnetic Properties After Application of Secondary Coating (C-5 over C-2) Magnetic Permeability at H = 10 Oe | Core Loss, watts per pound 15 kG | 17 kG | 18 kG | Decrease in Core Loss for Secondary Coating, watts per pound 15 kG | 17 kG | 18 kG | Remarks |
|---|---|---|---|---|---|---|---|---|---|---|---|---|---|---|
| | | 10.4 | 1938 | 0.410 | 0.539 | 0.661 | 1930 | 0.393 | 0.521 | 0.623 | 0.018 | 0.019 | 0.037 | |
| | | 14.3 | 1938 | 0.411 | 0.539 | 0.658 | 1927 | 0.391 | 0.519 | 0.624 | 0.020 | 0.020 | 0.035 | |
| | | 17.0 | 1938 | 0.410 | 0.539 | 0.656 | 1924 | 0.398 | 0.530 | 0.640 | 0.012 | 0.009 | 0.016 | |
| L | Head | 4.4 | 1929 | 0.386 | 0.508 | 0.616 | 1925 | 0.378 | 0.500 | 0.604 | 0.008 | 0.007 | 0.012 | Embodiment |
| | | 7.9 | 1929 | 0.385 | 0.507 | 0.614 | 1922 | 0.375 | 0.497 | 0.594 | 0.010 | 0.010 | 0.021 | |
| | | 10.3 | 1929 | 0.385 | 0.508 | 0.618 | 1920 | 0.372 | 0.494 | 0.588 | 0.014 | 0.014 | 0.030 | |
| | | 13.0 | 1929 | 0.385 | 0.507 | 0.614 | 1918 | 0.372 | 0.494 | 0.588 | 0.014 | 0.014 | 0.026 | |
| | | 16.3 | 1929 | 0.386 | 0.507 | 0.612 | 1914 | 0.375 | 0.500 | 0.596 | 0.011 | 0.008 | 0.016 | |
| | Tail | 4.7 | 1924 | 0.392 | 0.519 | 0.632 | 1920 | 0.386 | 0.513 | 0.622 | 0.006 | 0.006 | 0.010 | |
| | | 7.6 | 1924 | 0.392 | 0.518 | 0.631 | 1918 | 0.383 | 0.510 | 0.616 | 0.009 | 0.008 | 0.015 | |
| | | 10.5 | 1924 | 0.392 | 0.518 | 0.631 | 1916 | 0.382 | 0.509 | 0.613 | 0.011 | 0.010 | 0.018 | |
| | | 13.0 | 1924 | 0.391 | 0.518 | 0.634 | 1913 | 0.379 | 0.508 | 0.613 | 0.012 | 0.011 | 0.021 | |
| | | 16.4 | 1924 | 0.391 | 0.519 | 0.634 | 1911 | 0.382 | 0.513 | 0.624 | 0.009 | 0.005 | 0.010 | |
| M | Head | 4.6 | 1927 | 0.391 | 0.515 | 0.622 | 1923 | 0.384 | 0.507 | 0.609 | 0.008 | 0.008 | 0.013 | |
| | | 7.4 | 1927 | 0.391 | 0.515 | 0.622 | 1921 | 0.381 | 0.505 | 0.602 | 0.010 | 0.010 | 0.020 | |
| | | 10.2 | 1927 | 0.390 | 0.515 | 0.626 | 1918 | 0.379 | 0.504 | 0.603 | 0.011 | 0.011 | 0.024 | |
| | | 12.8 | 1927 | 0.392 | 0.515 | 0.622 | 1916 | 0.379 | 0.502 | 0.599 | 0.013 | 0.012 | 0.023 | |
| | | 16.1 | 1927 | 0.391 | 0.515 | 0.622 | 1912 | 0.380 | 0.508 | 0.609 | 0.011 | 0.007 | 0.013 | |
| | Tail | 4.5 | 1919 | 0.395 | 0.525 | 0.646 | 1915 | 0.389 | 0.520 | 0.638 | 0.005 | 0.004 | 0.008 | |
| | | 7.7 | 1919 | 0.395 | 0.525 | 0.645 | 1912 | 0.386 | 0.516 | 0.627 | 0.009 | 0.009 | 0.018 | |
| | | 9.9 | 1919 | 0.396 | 0.524 | 0.645 | 1911 | 0.386 | 0.517 | 0.626 | 0.009 | 0.008 | 0.019 | |
| | | 13.0 | 1919 | 0.396 | 0.525 | 0.645 | 1908 | 0.387 | 0.518 | 0.628 | 0.009 | 0.007 | 0.017 | |
| | | 16.3 | 1919 | 0.396 | 0.524 | 0.645 | 1905 | 0.388 | 0.522 | 0.637 | 0.007 | 0.003 | 0.008 | |

What is claimed is:

1. A grain oriented electrical steel sheet comprising chromium in a concentration of greater than about 1.2 wt. %, wherein during decarburization annealing the grain oriented electrical steel sheet has been rapidly heated at a rate in excess of 500° C/second to a temperature of about 700° C.; and wherein the grain oriented electrical steel sheet further comprises a forsterite coating formed on at least one surface of the grain oriented electrical steel sheet, wherein the forsterite coating has a free surface and wherein the forsterite coating is comprised of oxygen in a concentration greater than or equal to about 7.0 wt. % at one or more points in a region defined by a depth of about 2-3 μm below the free surface of the forsterite coating.

2. A grain oriented electrical steel sheet comprising chromium in a concentration of greater than about 1.2 wt. %, and at least one surface, the grain oriented electrical steel sheet comprising a surface region defined by a depth of less than or equal to 2.5 μm from the at least one surface and a bulk region defined by a depth greater than 2.5 μm from the at least one surface wherein the chromium concentration of said surface region is greater than the chromium concentration in said bulk region, when measured after decarburization annealing, wherein the grain oriented electrical steel sheet has been rapidly heated at a rate in excess of 500° C/second to a temperature of about 700° C., and before high temperature annealing.

* * * * *